Figures 1, 2:
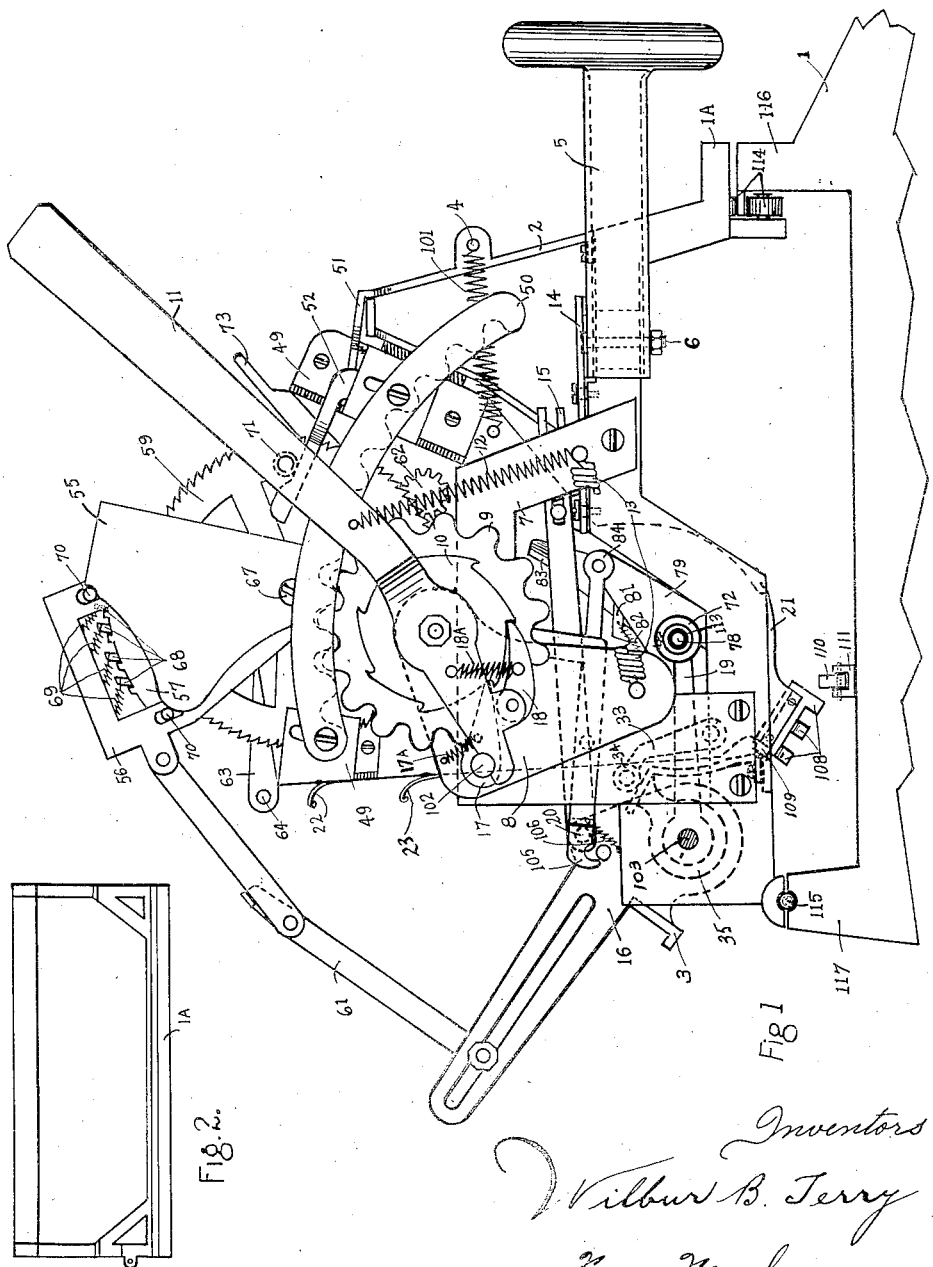

Nov. 21, 1933. W. B. TERRY ET AL 1,935,677
CARRIAGE FOR TYPEWRITERS AND ADDING TYPEWRITERS
Filed Oct. 23, 1930 4 Sheets-Sheet 1

Inventors:
Wilbur B. Terry
Fred Pincham

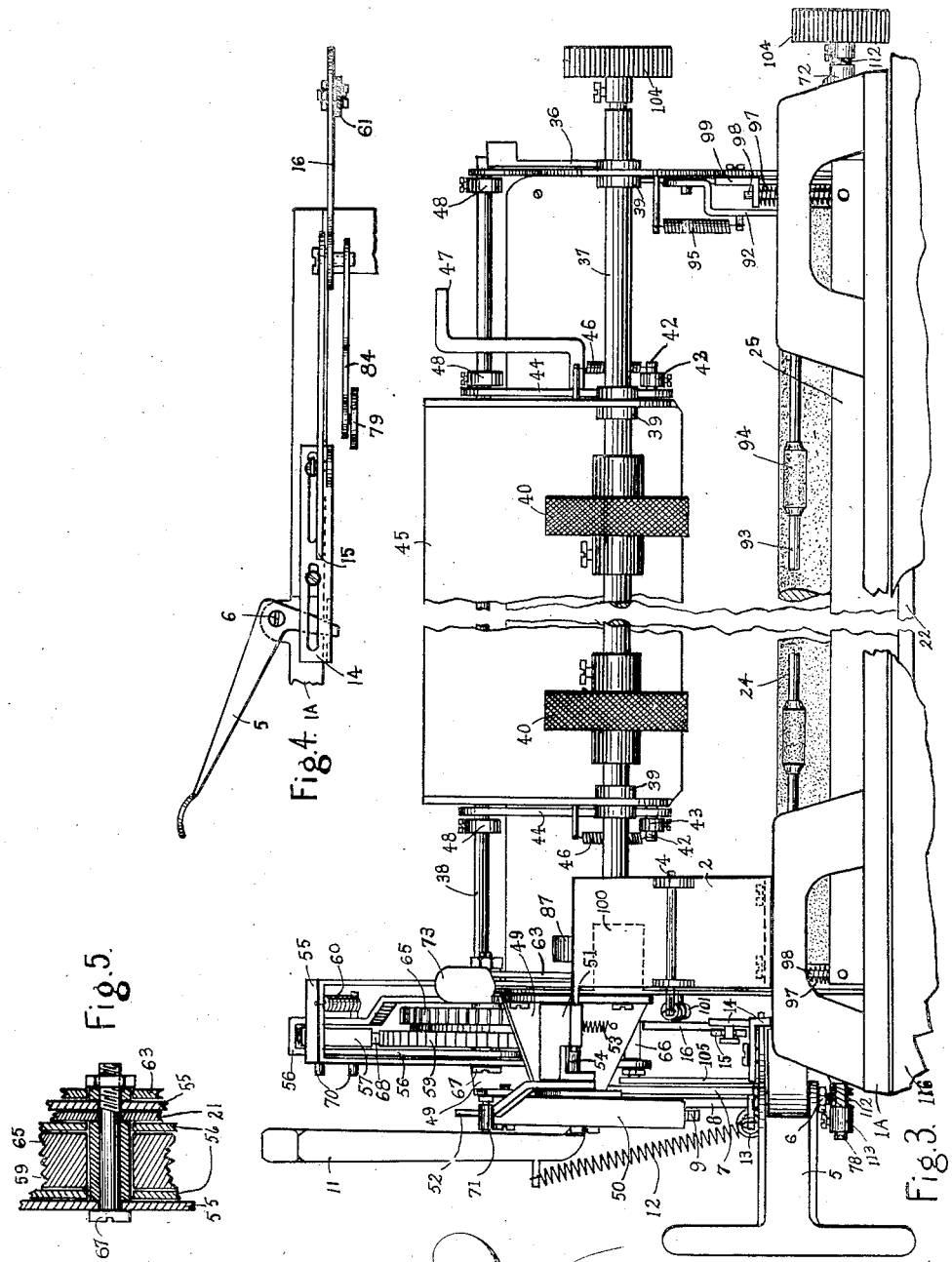

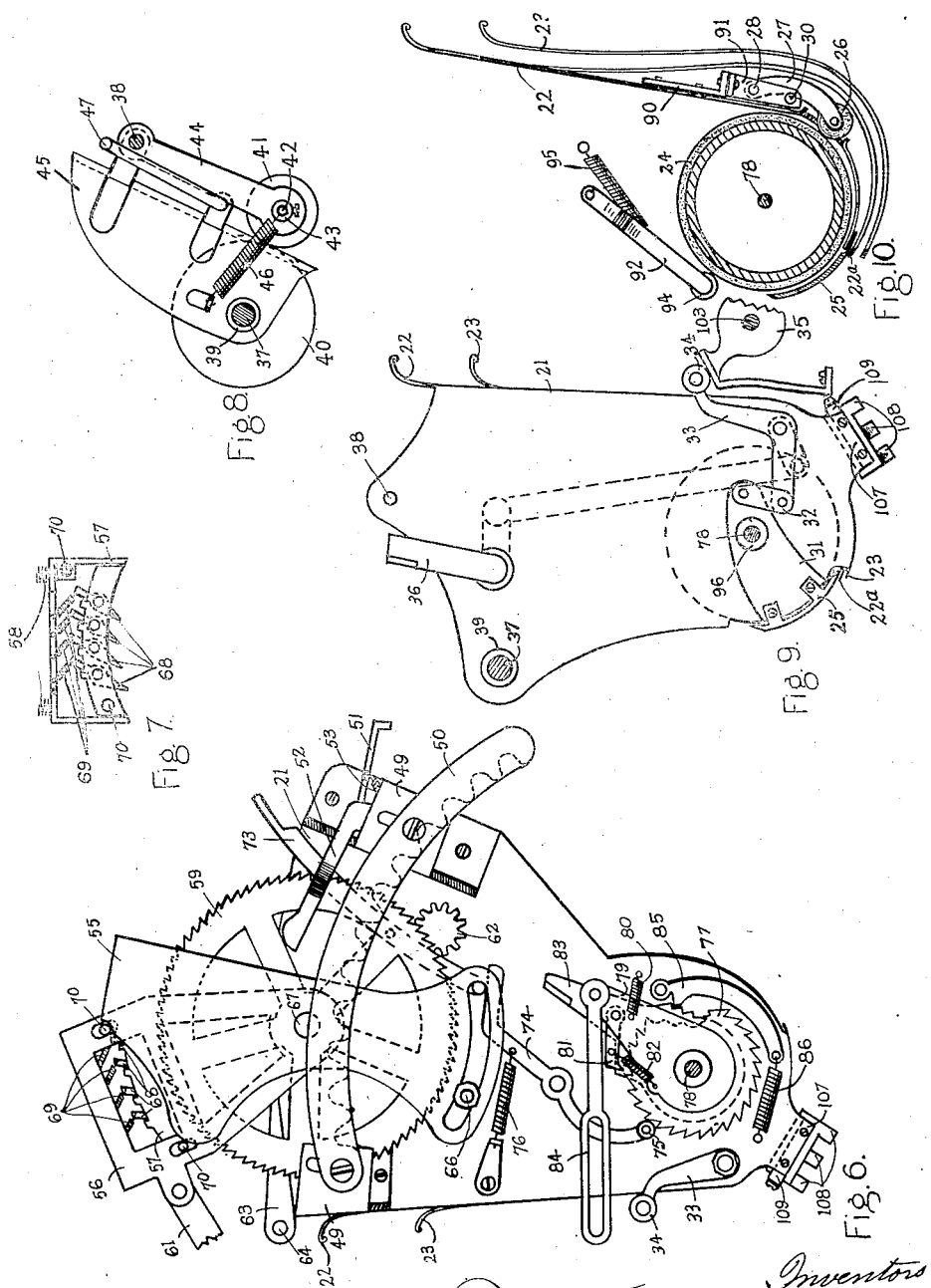

Nov. 21, 1933.   W. B. TERRY ET AL   1,935,677
CARRIAGE FOR TYPEWRITERS AND ADDING TYPEWRITERS
Filed Oct. 23, 1930   4 Sheets-Sheet 4
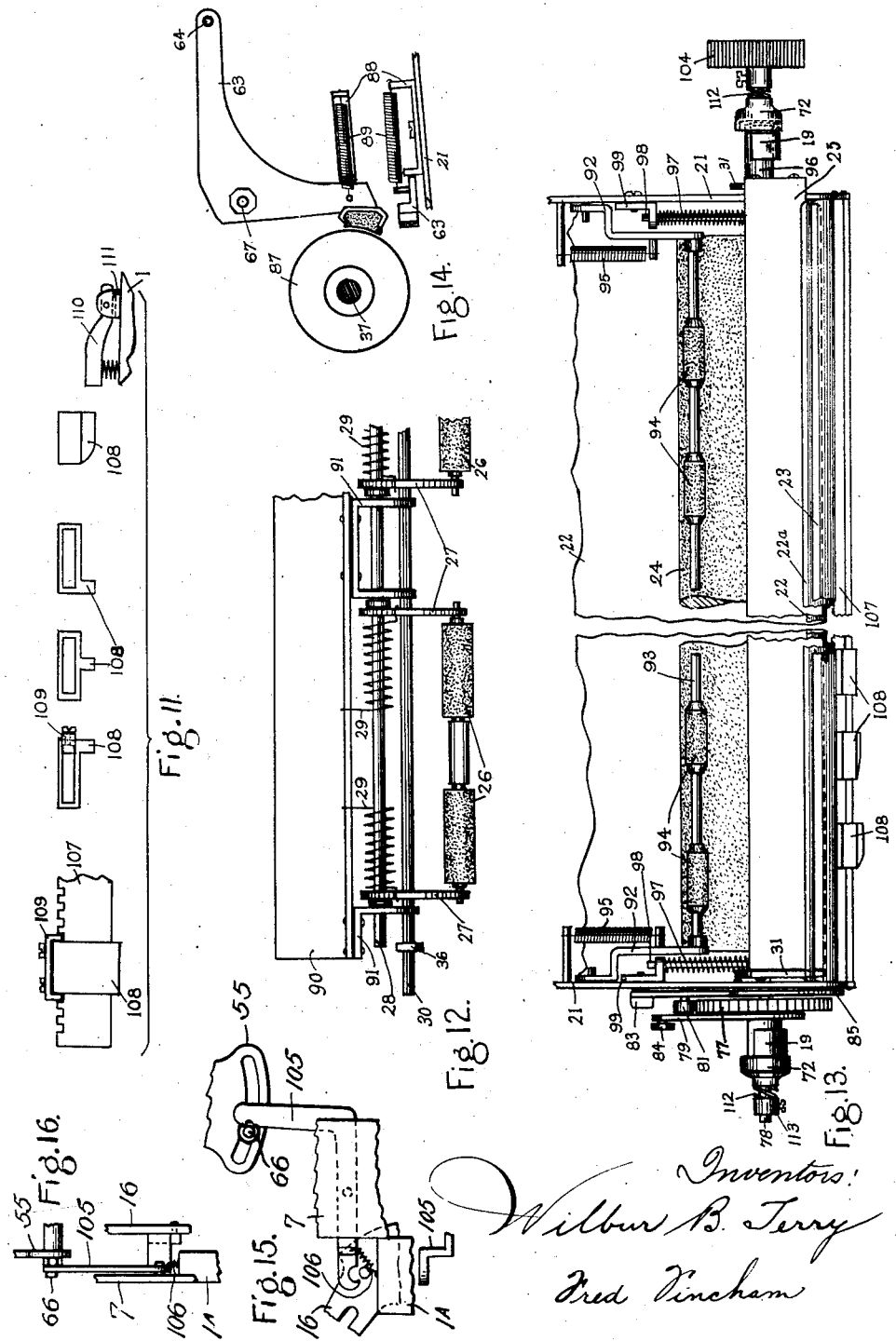

UNITED STATES PATENT OFFICE 1,935,677

CARRIAGE FOR TYPEWRITERS AND ADDING-TYPEWRITERS

Wilbur B. Terry and Fred Fincham, Toronto, Ontario, Canada

Application October 23, 1930, Serial No. 490,659, and in Canada July 25, 1930

20 Claims. (Cl. 197—128)

Our present invention relates especially to paper feeding mechanism, and its general object is to provide new and improved mechanism of the character specified.

More specifically stated, the object of our invention is to provide means for actuating a continuous strip of sheets such as cheques, invoices, etc., such means being associated with other means for continuously feeding another main sheet, such continuous feeding means is of a character commonly termed a platen feed; and in the present instance we provide for actuating the strip form feed by the same operation which actuates the platen feed.

Another object of our invention is to provide improved means for feeding and controlling separate work sheets arranged one above the other.

Another object is to provide for the differential feeding and advancing of such sheets.

Another object is to overcome the difficulty of the inability to type more than one line on a machine operating with separate work sheets arranged one above the other, when said work sheets are actuated at different speeds.

Another object is to provide means for automatically eliminating from inside sheets any typing which is not required on said sheets, but which must be written on the outer sheets.

Other objects will subsequently appear.

To the above and other ends our invention consists in the features of construction, combination of parts and devices, and arrangement of parts hereinafter described and particularly pointed out in the claims.

One form of our invention as applied to an Ellis adding-typewriter is illustrated in the accompanying drawings, wherein.—

Fig. 1, end view of tilting carriage mounted on machine in operating position.

Fig. 2, overhead view of carriage truck.

Fig. 3, front view of tilting carriage on machine in operating position.

Fig. 4, overhead view of levers which operate both platen and additional feed advancing means.

Fig. 5, sectional view of bearing which mounts additional feed advancing means.

Fig. 6, view of left end of tilting carriage removed from carriage truck.

Fig. 7, detail view of pawls and pawls casing in additional feed advancing means.

Fig. 8, end view of additional feed mechanism.

Fig. 9, view of right end of tilting carriage removed from the machine.

Fig. 10, view of right end of tilting carriage with end plate removed, showing platen feed mechanism and paper guides.

Fig. 11, view of selective return mechanism.

Fig. 12, detail view of platen roller, contact roller mechanism.

Fig. 13, front view of lower part of tilting carriage removed from the machine.

Fig. 14, inside view of braking mechanism.

Fig. 15, side view of locking lever 105 in released position.

Fig. 16, front view of locking lever 105.

The main frame of the Ellis adding-typewriter comprises a top plate 1 above which are fixed two guide rails 116 and 117 (see Fig. 1). The rear guide rail 117 is grooved and cooperates through antifriction balls 115 with the rear bar of the carriage truck 1A. The front guide rail 116 has a horizontal flange which cooperates with small rollers 114 mounted to the front bar of the said carriage truck in such a manner that they ride above and below the said flange on guide rail 116, allowing carriage truck 1A, which is a rectangular frame as shown in Fig. 2, free movement on said guide rails.

The carriage including paper advancing mechanisms (as in Fig. 3) is mounted on bearings 96, in sockets 19, sockets 19 being secured in the right and left ends of the carriage truck 1A by detachable bearings 103. Bearings 96 are mounted co-axial with the platen roller 24, the right end bearing being fixed to the carriage end plate 21 and the left end bearing fitted loosely over the axle 78. Platen roller axle 78 turns freely in said bearings. Collars 72 retain carriage in carriage truck, their larger hollow end fitting over a lip on sockets 19. Springs 112 hold collars 72 in place. The carriage is mounted in this manner so that it can be tilted backwards (by mechanism hereinafter described) a distance corresponding to the arc of three line spaces on the platen roller 24. The carriage is designed to handle main sheets with line by line spacing devices through the usual platen roller feed mechanism, and, an additional strip of sheets in continuous form, with a form to form sweep movement, fed through an additional feed mechanism, hereinafter described. The object of tilting the carriage backwards from its normal position is to give line by line spacing up to four lines on all forms without disturbing the position of the forms in the feed mechanisms, that is, without operating either the platen feed advancing means or the additional feed sweep advancing means.

On the left end of the front of the carriage truck 1A an upright or framework 2 is securely fastened. It serves as a bumper or stop for the carriage when it is returned to normal position. It also serves as a catch for the locking lever 51 which drops over the upper edge of said upright 2 automatically locking the carriage in front or normal position. A spring 101 is fastened to a spring perch 4 on upright 2 and to a stud on the left end plate 21. This spring is the means by which the carriage is returned to normal position when the carriage tilting mechanism is released. Locking lever 51, (pivotally mounted in bracket 49 to left end plate 21, by pin 54, and controlled by spring 53) is necessary to hold the carriage firmly in front or normal position when the sheet advancing mechanisms are operated. The operation of lever 51 is entirely automatic, its downward movement being limited so that when the carriage returns to normal position the hook on said lever will strike the flat top of upright 2, sliding over same until it drops into locking position. A continuation of lever 51, lever 52, extends so as to come in contact with a roller 71 mounted on the tilting lever 11, at the first move of which, roller 71 forces down lever 52 releasing lever 51 from the upright 2 and allowing the carriage to be tilted backwards.

The carriage truck 1A is provided with a second upright 7 to which a lever 8 is pivotally mounted at its centre upon a bearing 102, said bearing being a hollow collar mounted securely to upright 7 by a screw running through the centre. The upper end of lever 8 carries a short fixed stud which acts as a bearing for a gear 9, a ratchet wheel 10, and a tilting lever 11, (the gear 9 and the ratchet wheel 10 are fixed together as one unit). The said gear, ratchet wheel, and tilting lever being retained by a nut and washer on the threaded end of said stud. Tilting lever 11, returned by spring 12, carries a pawl 18, which is held in mesh with ratchet wheel 10 by a spring 18A. A second pawl 17 is held in mesh with ratchet wheel 10 by a spring 17A, and is mounted on bearing 102. Operation of tilting lever 11 causes pawl 18 to turn the combination gear and ratchet wheel 9 and 10 until pawl 17 engages the next tooth on the said ratchet wheel. Pawl 17 prevents said gear and ratchet wheel from reversing. Gear 9 meshes with rack 50 and said rack is fixedly mounted on the left carriage end plate 21 by two brackets 49. Turning of gear 9 causes the entire carriage to tilt backwards upon the tubular bearings 96, heretofore described. Tilting the carriage back until pawl 17 engages the next tooth on ratchet wheel 10 causes the platen and all sheets to move into position for the next line of writing, and to remain thus until lever 11 is again operated, (tilting mechanism is shown in Fig. 1). A strong spring 13, fastened from lower end of lever 8 to a projection on carriage truck 1A, exerts an upward pressure to the end carrying the gear 9, thereby keeping said gear in mesh with rack 50. Downward pressure on lever 11, the lower end of which rests against the outer end of bearing 102, forces lever 8 down against the pull of spring 13 until gear 9 is disengaged from rack 50, thereby allowing the carriage to tilt forward to normal position under the pull of spring 101. A projection 100, on left end plate 21, strikes bumper or upright 2, (a suitable shock-absorber being fixed between), whereupon the carriage is locked as heretofore described.

On the left end of carriage truck 1A a hand lever 5 is mounted to turn on a bearing 6, and extends through the turned down slotted portion of a slide 14, thereby operating said slide 14. Slide 14 has two slots down the centre to allow it to slide back and forth on two screws which hold it loosely to truck 1A. A small piece is turned up at the other end of slide 14 and is fitted with a pin which supports the slotted end of lever 15, thereby operating said lever 15, when itself (slide 14) is operated by lever 5. The front end of lever 15 is slotted to prevent movement of hand lever 5 when machine is operated by electricity (see next paragraph). The other end of lever 15 is pivotally mounted upon a pin 20 which extends through the lever 16. Lever 16 is pivotally mounted to the carriage truck 1A by left end bearing 103 and is the lever through which both the platen feed advancing means and the additional feed advancing means are connected up and operated. It is slotted to provide adjustment on the additional feed advancing means.

Lever 16 is merely a variation of a lever now on the machine to which we have adapted our carriage, and is operated by an electrically operated carriage return system which moves carriage to right for the start of a new line. We have not specified same as it is not part of our invention, and is in different forms on types of machines to which our carriage can be adapted. This pertains to the angle bracket 3 already on the machine with which we have been working, and which only operates when the machine is being used as a common adding machine.

Movement of lever 16 also operates lever 84, slotted portion of which slides freely on pin 20, and is slotted so that lever 16 will pull lever 84, but lever 84 will not push lever 16 when the carriage is tilted backwards. (An overhead view of these operating levers is shown in Fig. 4). The other end of lever 84 is pivotally mounted on lever 79, lever 79 being pivotally mounted on shaft 78, and turning ratchet wheel 77 by means of a pawl 81, controlled by spring 82. Ratchet wheel 77 is fixedly mounted on shaft 78, upon which platen roller 24 is fixed by set screws, therefore pulling lever 84 turns the platen roller 24, the distance of movement being adjusted by lever 83, upon a shoulder of which a pin in pawl 81 rides so as to hold said pawl clear of ratchet wheel 77 when platen advancing mechanism is inactive. As pawl 81 moves a distance corresponding to three teeth on ratchet wheel 77, setting lever 83 in first position allows pawl 81 to drop into engagement with nearest tooth, as soon as lever 84 is actuated, thereby turning the platen roller three spaces. Each tooth on ratchet wheel 77 represents a line of typing on the platen roller 24. With lever 83 in second position pawl does not engage ratchet wheel 77 until second tooth is reached, therefore turning the platen roller two spaces, in third position platen is only turned one space. Lever 83 is held in adjustment by lever 85, which is held in notches or teeth on lever 83 by spring 86. Levers 79 and 84 are returned by spring 80. Tension on ratchet wheel 77 to secure accurate spacing on platen roller 24 is provided by a lever 74 pivotally mounted to left end plate 21, and carrying on one end a small roller 75 which drops into the spaces between the teeth on ratchet wheel 77, and is held there by a spring 76 pulling on the other end of lever 74. A lever 73 or finger piece to disengage said roller 75 from ratchet wheel 77 is pivotally mounted to left end plate 21 in such a manner that when its upper end is pushed backwards the lower end will come forward forcing down the angled end of lever 74. (Platen feed advancing mechanism described in this paragraph is clearly shown in Fig. 6.) The above described platen roller advancing mechanism, with the exception of slight changes in the shapes of some of the levers, is that already in use on the machine to which we have adapted our carriage, we are not therefore claiming same as part of our invention but are showing it because of its relation to the new improvements. Any other form of platen roller advancing means could be adapted to operate with the new improvements which we claim.

A lever 61, jointed so that the backward tilting of the carriage will not affect lever 16, is pivotally and adjustably mounted in slot in lever 16. The other end of lever 61 is pivotally connected to a U-shaped movable frame 56, which carries in itself a small casing 57, containing four pawls 68 and their retaining springs 69. This casing is slidably mounted in said movable frame by pins 70 extending through slots in said frame. Springs 58, fastened in frame 56, exert a downward pressure to casing 57 thus keeping pawls 68 in mesh with a ratchet wheel 59. Ratchet wheel 59 is fixed solidly to a gear 65, which in turn meshes with a small pinion 62. A U-shaped framework 55 is placed around the outside of movable frame 56, which is in turn around ratchet wheel 59 and gear 65. Frame 55 is adjustably connected to end plate 21 by a screw running through the centre of a bearing 67, upon which ratchet wheel 59, gear 65 and movable frame 56 are mounted to turn freely (see Figs. 5 and 6).

The outside arm of frame 55 is extended and slotted to fit over a stud 66, on left end plate 21, the end of said stud being threaded and supplied with a nut to hold frame 55 in required position. As movable frame 56 is drawn down by lever 61, pawls 68 engage ratchet wheel 59 and turn same until the end of stroke, whereupon spring 60 returns movable frame 56 until the pins 70 come into contact with the curved edge of frame 55 which stops frame 56 and lifts the pawl casing inside said frame, disengaging pawls from ratchet wheel and allowing same to be turned either way by hand if necessary.

Referring to pawls 68, if only one pawl was used the smallest adjustment possible would be the distance between two teeth on the ratchet wheel 59 (in this case one-tenth of an inch). By using four pawls and spacing their points one and one-quarter teeth or five-fortieths of an inch apart, moving frame 55 one-fortieth of an inch at its upper end would allow a new pawl to engage ratchet wheel 59 when lever 61 was operated by lever 16, giving therefore, a minor adjustment at ratchet wheel 59 of one-fortieth of an inch. With the wide limits of adjustment by frame 55 and lever 16, the machine is capable of handling a wide range of sheets of various sizes without interchange of mechanism.

The pinion 62 is fixed to the end of a shaft 37 which extends across the carriage, through both end plates 21, and through ends of a sheet deflector 45, shaft 37 being mounted at all frictional points by bushings 39. The sheet deflector or guide 45 is a flat piece of metal, shaped as shown in Figs. 3 and 8, with ends turned forward and portions cut out and turned backward to form brackets to support said deflector. Mounted on shaft 37 close to and inside of left end plate 21 is a brake wheel 87. A flat angular lever 63 is pivotally mounted to the end plate and has a shoe on its lower end which comes into contact with said brake wheel 87 when the pin 64, fixed to the upper end of said lever 63 is forced down by the action of moving frame 56. This braking action prevents the feed mechanism from carrying the sheets too far by momentum. Brake lever 63 is controlled by a spring 89 mounted on a bracket 88 to left end plate 21 (braking mechanism is shown in Fig. 14).

Upon shaft 37 inside guide 45 are mounted two knurled wheels 40, which form the feed for the additional sheets. A rod 38 extending from end to end of carriage, supports the paper deflector or guide 45, and also supports two arms 44, which in turn support a shaft 42 extending along the back of guide 45, and held in place by collars 43. Two small knurled rollers 41 which we will call contact rollers are set to run freely on shaft 42, and in such a position that they will mesh with the feed rollers 40 through holes in guide 45. Contact rollers 41 are held in mesh with feed rollers 40 by spring 46, fixed from projections on ends of guide 45 to the ends of shaft 42. A crank-shaped lever or rod 47 passes through brackets on the back of guide 45 and is flattened to form cams where it comes into contact with arms 44. Turning of crank 47 raises arms 44, thereby disengaging contact rollers 41 from feed rollers 40 to allow sheets to be inserted or adjusted between said rollers. (See Figs. 3 and 8). Collars 48 on guide support rod 38, and set screws on feed rollers 40 allow the whole feed assembly to be moved endwise on rod 38 and shaft 37 to bring the outer forms or sheets to the desired position over the main sheets, which are being fed around the platen roller 24.

The main sheets are held against the platen roller 24 by pairs of contact rollers 26 (number required being governed by the length of platen roller used), operating at the back of platen roller 24, each pair of contact rollers being suspended from a rod 28 by two arms 27. Rod 28 is supported by brackets 91 which are secured to a long angle bracket 90, which is in turn secured to the end plates 21. Pressure is supplied to the contact rollers 26 by springs 29, which press on arms 27, the other end being hooked over the edge of bracket 90 after the proper tension has been applied. Pressure is released by turning rod 30 through the lever 36 on right end plate 21, rod 30, running through holes in brackets 91 and being flattened where it comes into contact with the arms 27 to form cams which lift said arms and release contact rollers 26 from platen roller 24, thus allowing sheets to be inserted or adjusted (see Figs. 3, 10 and 12).

A second set of contact rollers 94, to hold all the sheets against the front of platen roller 24, is provided on a shaft 93, which is mounted on two supporting levers 92, said levers 92 being pivotally mounted to the end plates 21. Springs 95 are fastened to levers 92 and to projecting pins in end plates 21 in such a manner that they exert a downward pull to levers 92 until shaft 93 is lifted above a certain point, whereupon they will hold same in this raised position, leaving sheets free to be adjusted and leaving hands free to do said adjusting.

Thin sheets of metal 22, 22A and 23 are used as deflectors to guide the sheets into the feed mechanisms. These deflectors are securely fixed to the end plates 21. The inside deflector 22 passes between the contact roller mechanism and the platen roller 24, but is slotted to allow the contact rollers 26 to press against the platen roller 24. A guard 22A passes around the outside of the contact roller assembly to prevent any interference with the feeding of the additional continuous forms passing inside of deflector 23 the outside deflector 23 starts from the back of carriage and follows in the same direction as the guard or guide 22A, leaving enough space between to allow free movement of said continuous forms. These deflectors or guides 22, 22A and 23 extend to within approximately two-thirds of an inch of the point where the type strikes platen roller 24, the outside deflector 23 guiding the continuous forms or sheets from the back of machine past the typing surface on platen roller 24 to rollers 40 and 41, thus allowing said continuous forms to be shifted or advanced independently to the sheet or sheets fed through deflector 22 around the platen feed roller.

A thin sheet of metal or like material (called a cut-off) 25, conforming to the shape of the platen feed roller 24, has its lower edge cut away to about half its thickness (see Fig. 10), this edge being placed between the front edges of deflector 22 and guard 22A, to sufficient depth to allow of an upward movement of approximately one-quarter of an inch without coming clear of said deflector 22 and guard 22A. The upper bevelled edge of cut-off 25 comes just below the point where the type strikes platen roller 24, when said cut-off 25 is in normal or down position. Said cut-off 25 is therefore between the main sheet or sheets fed through deflector 22 around the platen roller 24, and the continuous forms or sheets being fed through deflector 23 and into the additional feed rollers 40. Two supporting brackets 31 are securely fixed to the ends of cut-off 25, the right bracket being pivotally mounted on carriage bearing 96 on the outside of right end plate 21. The left bracket 31 is pivotally mounted on shaft 78 on the inside of left end plate 21, being mounted thus to prevent interference with other mechanism on the outside of said end plate. The cut-off therefore moves around the same axis as the platen roller 24. Both supporting brackets 31 are connected at the small ends to short levers 32, which in turn are connected to angle levers 33. The right end angle lever 33 is pivotally mounted on the end of shaft 30 (see Fig. 9). The left angle lever 33 is made in two parts, one part being on the inside of left end plate 21 and the other being on the outside of said end plate 21, both parts being solidly connected by a short shaft through a bushing in said end plate 21 (see Fig. 6). The upper ends of levers 33 are fitted with small rollers or wheels 34, which operate on flat tracks 35, said tracks being supported in carriage truck 1A by bearings 103 at the upper ends, and carriage spacing rack (not shown in drawings) at the lower ends. These tracks 35 are shaped and adjusted so that when the carriage is tilted backwards one space as heretofore described, the small wheels 34 will force forward the upper ends of levers 33, which will force down the small end of brackets 31, thus raising the cut-off 25 high enough so that the type will now strike on said cut-off 25, preventing the writing from appearing on the main sheet or sheets being fed through the paper deflector 22 around the platen feed roller 24. Tracks 35 are curved in such a way that the cut-off 25 is held in this raised position until the carriage is returned to front or normal position, whereupon the aforementioned mechanism is returned to normal or down position by the action of springs 97 (see Fig. 3), said springs being mounted on cut-off 25 by pins 98. Pins 98 are loosely fitted to cut-off 25 and are kept in place by brackets 99 on end plates 21. Cut-off 25 can be made so as to eliminate one, two or three lines from the main sheets by using different widths of cut-offs and by adjusting tracks 35 to raise the cut-off at the proper time. This type of cut-off can only be used in conjunction with the tilting carriage mechanism, and its operation is entirely automatic.

Both feed mechanisms are provided with finger wheels 104 for hand adjustment of the sheets, the one on shaft 78 acting as a retainer for spring 112, a collar 113 performing the same function on the other end of shaft 78.

An L-shaped locking lever 105, controlled by spring 106, is pivotally mounted by the centre of its long side, to the upright 7 (see Fig. 1). This long arm of lever 105 is hook shaped at the end and when in locked position catches over a stud on lever 16. The short arm of lever 105 comes into contact with stud 66 (see Fig. 6) on carriage end plate 21. When the carriage is returned to normal position stud 66 bears against this end of lever 105 releasing hooked end from stud on lever 16, but when the carriage is tilted backwards stud 66 moves clear of locking lever 105, allowing it to drop into locking position. As heretofore explained the sheets in both feed mechanisms are advanced, only, when the tilting carriage is in normal position, and that line by line spacing is gotten on all forms, through the tilting of the carriage without disturbing the position of the sheets in the feed mechanisms, therefore, as carriage return lever 5, through levers 14, 15 and 16, operates both feed mechanisms in addition to returning the carriage to the right for the start of a new line, it is necessary to have this lever rigid or inoperative, when the carriage is tilted backwards in order that the carriage may be returned to the right by lever 5 without operating the feed mechanisms. This is accomplished automatically by locking lever 105 as heretofore described.

On the bottom and near the back of the carriage a stop bar 107 is mounted securely to the carriage end plates 21. Selective return stops 108 are made with lugs in three different positions to take care of the return of the carriage in each of the three tilting positions. (These stops are shown clearly in Fig. 11.) Stops 108 can be mounted in any desired position along stop bar 107 and are locked in position by locking lugs 109. A fixed stop 110 is mounted on the top plate 1 of the machine, by a bracket 111. This stop 110 is spring controlled and is shaped so that stops 108 will pass over it when the carriage is being operated to the left but the carriage will be stopped by stops 108 coming into contact with it when the carriage is being returned to the right. If it is necessary for any reason to pass by the point where a stop is fixed, a partial operation of tilting lever 11 will allow stop 110 to clear the lug on stop 108. When set up for a particular form this selective return mechanism working in conjunction with the tilting carriage is entirely automatic in its operation. The first line on the form in the additional feed mechanism, with the carriage in normal position, being taken care of by the marginal stop which is standard equipment on all machines (not shown in our drawings) and any additional lines, written with the carriage in any of the three tilted positions, being taken care of by the selective return mechanism.

The operation of the machine is as follows:—

For example, where cheques are issued by mail in window faced envelopes, the cheque could be written to show the particulars for office records such as, the reference number, name, amount, and period covered on the first line, this line also being written at the same time on the inside office record sheets by the use of carbon paper. The payee's address would take two more lines, and the written amount a fourth line. These cheques could be printed in continuous form and would be fed from the back of the machine through the outside deflector to the additional feed mechanism. One or more office record sheets with carbon on top and between would be fed around the platen roller and adjusted for the first line of writing. The cheques would be lined up in the proper position over the office record sheets and the first line would be written. Any particulars not required on the cheques but necessary for office records can be written on the record sheets either to the right or the left of the cheques on the same line, the record or main sheets being made wider than the cheques for this purpose. After the first line is completed the carriage tilting lever is operated, bringing the platen roller and all forms into position for a second line of writing, in this case the payee's street and number, the cut-off also comes into position automatically to eliminate any further particulars from the main or record sheets. The carriage return lever has been automatically made inoperative through the locking devices on the feed mechanisms and the carriage is returned to the right without disturbing the position of the sheets, until the first selective return stop comes into contact with the fixed stop on the top plate of the machine, this selective stop having been fixed in the proper position to stop the carriage under the payee's name. The payee's street and number is now written. The tilting lever is again operated bringing forms into position for the third line, in this case the payee's town or city, the second selective return stop comes into line with the fixed stop on the top plate of the machine and stops the carriage in the proper place to write in the post office address when the return lever is operated. Tilting lever is again operated bringing all forms into position for the fourth line, in this case the written amount on the cheque. The carriage is returned to the right until stopped by the third selective return stop, the amount is written on the cheque and now it is completed. The tilting lever is depressed allowing the carriage to return to front or normal position, the cut-off to return to normal position and the locking lever on the feed mechanisms to be released. The carriage return lever is then operated moving carriage to the right of the machine, operating additional feed mechanism to advance cheques to the proper place for the initial line on the next cheque and advancing the office record sheets one line. The machine is now in readiness for the writing of the next cheque.

Many other methods of actuating the novel devices embodying our present invention for various desirable purposes will suggest themselves to those skilled in the art, as will various changes which may be made without departing from our invention.

We are aware that prior to our invention, typewriting machines have been made to operate with various feed mechanisms; we do not therefore claim such a combination broadly, but what we do claim as new and desire to secure by Letters Patent, is:—

1. In a typewriting machine, the combination of a carriage truck, a carriage, a platen with means for advancing a record sheet thereover, means for feeding an additional web overtop of said record sheet, and means to suspend the carriage in the said carriage truck so that the said carriage can be tilted back on a common axis with the platen, to move said additional web one or more line spaces past the printing point without operation of said sheet and web advancing means.

2. In a typewriting machine, the combination of a carriage truck; a carriage; a platen roller with means for advancing a record sheet thereover; means for feeding an additional web overtop of said record sheet; and means to suspend the carriage in the said carriage truck in such a manner that the carriage can be moved in an arc around the same axis as the platen roller, thereby moving the said web one or more line space distances past the printing point without actuation of said record sheet and web advancing means, said suspension means including bearings fixed to the ends of the carriage co-axial with the platen roller and sockets fixed to the carriage truck to receive said bearings.

3. In a typewriting machine, the combination of a carriage truck; a carriage; a revoluble platen with means for advancing a record sheet thereover, means for advancing an additional web overtop of said record sheet; means for suspension of the carriage in the carriage truck so that the said carriage can be given a circular or tilting movement around the axis of the said platen; and means operable for tilting the said carriage so as to move the said web one or more line space distances past the printing point without actuating the said record sheet and web advancing means, such tilting means including a rack on one end of the carriage, an upright fixed to the corresponding end of the carriage truck, a lever pivotally mounted upon the said upright, a gear, a ratchet wheel and a finger piece pivotally supported upon the said lever, a pawl mounted upon the said finger piece to engage the said ratchet wheel, and a spring fixed from the said lever to the carriage truck in a manner to keep the said gear in mesh with the said rack.

4. In a typewriting machine, the combination of a carriage truck; a carriage; a platen roller with means for advancing a record sheet thereover; means for advancing an additional web overlaying the said record sheet but independent of the said platen roller; means for suspending the said carriage in the said carriage truck in such a manner that the carriage may be moved or tilted in an arc upon the same axis as the platen roller, thus moving the said web one or more line space distances past the printing point without actuation of the said record sheet and web advancing means; means for giving the said tilting movement to the carriage; a stop to position the said carriage in the front or normal position, said stop comprising an upright on the front of the carriage truck with suitable shock absorbing bumper; and means for returning the carriage to the front or normal position, the said returning means comprising a spring fixed from the carriage to the said upright or bumper.

5. In a typewriting machine, the combination of a carriage truck; a carriage; a platen roller with means for advancing a record sheet thereover; means for feeding an additional web independent of the said platen roller; means to suspend the carriage in the carriage truck in such a manner that the said carriage can be moved or tilted in an arc with an axis corresponding to the axis of the platen roller; means, comprising a spring attached from the carriage to an upright on the carriage truck, to return the said carriage to the front or normal position; and means to carry out the aforementioned tilting movement of the carriage so that the web will be moved one or more line space distances past the printing point without operating the said record sheet and web advancing means, the said tilting means comprising a rack on one end of the carriage, an upright on the corresponding end of the carriage truck, a lever pivotally mounted to the said upright and supporting a gear, a ratchet wheel and a finger piece, a pawl mounted on the finger piece to operate the gear and the gear being held in mesh with the rack by a spring connected from the lever to a stud on the carriage truck.

6. In a typewriting machine, the combination of a carriage truck, a carriage, a platen roller with line by line spacing means for advancing a record sheet thereover; means for advancing an additional web independent of the said record sheet and platen roller; means for suspending the carriage in the carriage truck in such a manner that the said carriage can be given a tilting movement upon an axis corresponding to the axis of the platen roller in order to move the web one or more line space distances past the printing point without operating the said advancing means; means operable to give the said tilting movement to the carriage; means for holding the carriage in any of the tilted positions, and means for returning to and holding the said carriage in the front or normal position.

7. In a typewriting machine, the combination of a carriage truck; a carriage; a platen with line by line spacing means for advancing a record sheet thereover; means for advancing an additional web independent of the said record sheet and platen roller; means for suspending the said carriage in the carriage truck in such a manner that the said carriage can be given a tilted movement upon an axis corresponding to the axis of the platen roller; means operable for tilting the carriage in order to move the said web one or more line-space distances past the printing point, such means including a rack on one end of the carriage, an upright fixed to the corresponding end of the carriage truck, a lever pivotally mounted upon the said upright, a combination gear and ratchet wheel and a finger piece mounted on the said lever, a pawl on the said finger piece to operate the said gear and ratchet wheel, a spring from the said lever to the carriage truck to keep the said gear in mesh with the said rack; means to hold the carriage in any required position of tilt, said means including a second pawl to act upon the aforementioned ratchet wheel to prevent a reverse movement of the said ratchet wheel; means, including a spring fixed from the said carriage to an upright on the carriage truck, to return the said carriage to the front or normal position; and means to disengage the said carriage tilting means from the said carriage to allow the carriage to be returned to normal position by the said carriage return spring, such means being a stop to limit the reverse movement of the said finger piece and causing the finger piece to move the said lever on which it is mounted along with said ratchet wheel and gear, carrying the said gear clear of and disengaging it from the said rack on the end of the carriage.

8. In a typewriting machine, the combination of a carriage truck; a carriage; a rotary platen with line by line spacing means for advancing a record sheet thereover; means for advancing an additional web independent of the said record sheet and platen; means for suspending the said carriage in the carriage truck in such a manner that the said carriage may be tilted back in an arc with the axis of the said arc corresponding to the axis of the said platen; means operable for carrying out the said tilting movement so that the said web will be moved one or more line space distances past the printing point; means for holding the said carriage in several different positions of tilt; means for releasing the said carriage from tilted positions; means for returning the carriage to front or normal position; and means for positively locking the said carriage automatically against accidental movement from normal position until the said tilting means is actuated, such means including an upright on the carriage truck, a bracket on the said upright and a spring controlled hook or catch pivotally mounted to the carriage and engaging the said bracket.

9. In a typewriting machine, the combination of a carriage truck; a carriage; a rotary platen with line by line spacing means for advancing a record sheet thereover; means for advancing an additional web independent of the said record sheet and platen; means for suspending the said carriage in the said carriage truck so as to allow the carriage to be tilted backwards from its normal position on an axis which corresponds to the axis of the platen; means including a finger piece, operable for tilting the said carriage to move the said web one or more line space distances past the printing point; means for holding the said carriage in any position of tilt; means for returning the said carriage to the front or normal position; means, including a bracket fixed to an upright on the carriage truck and a spring controlled hook or catch to engage the said bracket, for locking automatically the said carriage against accidental tilting, and means for releasing the said locking means automatically when the said tilting means is actuated, said means including a cam on said hook or catch and a projection on the aforementioned finger piece in proximity to said cam and engaging said cam on its first movement releasing the said catch from the said bracket.

10. In a typewriting machine, the combination of a carriage truck, a carriage, a revoluble platen with line spacing means for advancing a record sheet thereover; means, mounted in said carriage, for advancing an additional web independent of said platen, such means including a displaceable web guide or frame, a revoluble shaft running through said frame, two feed rollers fixed to said shaft, two pressure rollers to hold the web against the feed rollers, an axle to carry the said pressure rollers, two arms supporting the said axle, two springs supplying the tension to the said pressure rollers, a finger piece to release the said pressure rollers, a rod mounting the said frame or guide in the carriage above the platen, and a deflector to guide the web from the back of the carriage beneath the platen and to the front to allow the web to cross the printing point on the platen to the said feed rollers; means for pivotally suspending or mounting the carriage in the carriage truck upon the axis of the platen, and means operable for tilting the said carriage backwards from its normal position in order to line space the said web without actuating the said web advancing means.

11. In a typewriting machine, the combination of a rotary platen with means for feeding thereover a main sheet; step by step platen feed advancing devices; an additional feed mechanism for advancing additional sheets in continuous form independent of said platen feed means, the said mechanism including two feed rollers, a drive shaft on which the feed rollers are mounted, and contact rollers; and adjustable means to operate the said additional feed mechanism automatically when the platen feed advancing mechanism is operated, said means comprising a pinion on one end of the drive shaft, a gear to mesh with same, a ratchet wheel fixed solidly to the said gear, a combination of spring controlled pawls, a casing for the said pawls, a spring controlled carrier for the said casing, a bearing for the said gear, a ratchet wheel and pawl casing carrier, an adjustable stop for the said carrier, and a jointed lever connecting the said carrier to the aforementioned platen feed advancing mechanism.

12. In a typewriting machine, the combination of a platen feed; a platen feed advancing mechanism; an additional feed mechanism for advancing additional sheets in continuous form independent of the said platen feed, including two feed rollers and a drive shaft on which the said rollers are mounted: means to operate said additional feed mechanism automatically when the platen feed advancing mechanism is operated, such means including a gear, a ratchet wheel fixed to said gear, pawls to mesh with said ratchet wheel, and a carrier for said pawls; and means to automatically prevent said mechanism from carrying the sheets too far by momentum, said means comprising a brake wheel on the aforementioned drive shaft, a spring controlled brake lever and shoe, and a pin extending from said brake lever to come into contact with the pawl carrier at the end of its stroke.

13. In a typewriting machine, the combination of a rotary platen; means for feeding a main sheet thereover, including contact roller assembly and deflector; step by step line spacing devices for said platen; an additional feed mechanism for advancing additional sheets in continuous form independent of said platen, and overtop of main sheet thereon, such means comprising a guard to enclose the aforementioned contact roller assembly, an additional deflector passing from the rear of the machine around said guard, two feed rollers, a drive shaft on which said feed rollers are mounted; and devices for operating such additional feed mechanism automatically when the platen line spacing devices are operated.

14. In a typewriting machine, the combination of a carriage truck; a tilting carriage; bearings on the ends of the tilting carriage; sockets in the ends of the carriage truck in which the carriage is pivotally mounted by said bearings; a rotary platen mounted in the carriage co-axial with the carriage bearings; means for feeding a main sheet thereover; an additional feed mechanism for advancing additional sheets in continuous form past the typing surface on said platen; means to tilt the carriage backwards from normal position step by step three spaces, and means to eliminate part of typing from the main sheet, such means comprising a cut-off between the main sheet and the additional continuous sheets; mounting brackets for same, pivotally mounted on carriage bearings; operating arms, connecting levers between the mounting brackets and the operating arms, small wheels on the ends of operating arms, and tracks fixed to carriage truck in which said wheels run, said cut-off being automatically operated when the carriage tilting mechanism is actuated, but remains clear of typing surface when the carriage is in normal position.

15. In a typewriting machine, the combination of a carriage truck; a carriage; a platen roller with line space advancing means therefor; means for pivotally suspending said carriage in the carriage truck so that the said carriage can be tilted backwards upon an axis concentric with the axis of the platen roller; means, mounted upon the said carriage, for advancing an additional continuous web independent of said platen, and means operable for tilting said carriage backwards from its normal position in order to line space the additional continuous web without actuating the said web advancing means.

16. In a typewriting machine, the combination of a carriage truck; a carriage; a platen roller with line spacing means for advancing a record sheet thereover; means for pivotally mounting the carriage in the carriage truck upon an axis concentric to the axis of the platen roller; means for advancing an additional continuous web independent of the said platen; means operable for tilting the said carriage backwards from its normal position in the carriage truck in order to line space the continuous web without actuating the said web advancing means; and means to automatically eliminate from the record sheet any printing which is not required on said sheet but which must appear on the continuous web.

17. In a typewriting machine, the combination of a carriage truck; a carriage; a revoluble platen with line spacing means for advancing a record sheet thereover; means for pivotally mounting said carriage in the carriage truck upon the axis of the platen roller; means, mounted upon said carriage, for advancing an additional continuous web independent of the said platen; means operable for giving a tilting movement to said carriage in order to line space said continuous web past the printing point without operating said web advancing means; means to eliminate from the record sheet any typing not required thereon but which must appear on said web, such means including a shield, operating between the record sheet and the web, which normally rests clear of said printing point but which automatically moves to cover said printing point when said carriage tilting means is operated; and means for automatically giving a sweep movement to the continuous web when the platen roller advancing means is operated.

18. In a typewriting machine, the combination of a carriage truck; a tilting carriage; carriage supports in said carriage truck; a platen roller mounted in tilting carriage; means to feed thereover a main sheet with step by step line spacing devices; an additional feed mechanism with means to feed additional sheets in continuous form past the typing surface on platen roller, and means to give to said additional feed mechanism a sweep movement automatically when platen roller line spacing devices are operated, said means including a gear, a ratchet wheel fixed to said gear, a pawl casing containing four spring controlled pawls to mesh with said ratchet wheel, said pawls being spaced one and one quarter teeth apart to provide for fine adjustment on said ratchet wheel, also adjustable stop devices and a slotted operating lever for variably limiting the extent of said sweep movement.

19. In a typewriting machine, the combination of a top plate with guide rails; a carriage truck mounted on said guide rails; a tilting carriage; bearings on ends of said carriage; sockets in carriage truck in which carriage is pivotally mounted by said bearings; a rotary platen with means for advancing thereover a main sheet with line by line spacing devices; an additional feed mechanism for advancing additional sheets in continuous form independent of said platen, with form by form sweep movement; means to tilt the carriage backwards from its normal position, step by step three spaces, allowing line by line spacing up to four lines on all forms without changing the position of same in the feed mechanisms; means to actuate both the platen roller spacing devices and the additional feed sweep mechanism, including a hand carriage return lever, operating levers connecting said carriage return lever to the said feed mechanisms, and means to automatically lock said feed mechanisms when the carriage is tilted backwards from its normal position, said means comprising a hooked spring controlled L-shaped lever pivotally mounted to an upright on the carriage truck, a catch or stud, over which said hooked lever drops when the carriage is tilted backwards from its normal position, said stud being fixed to the lever which operates both feed advancing means, and a stud fixed to the end of the tilting carriage so as to come in contact with the other end of the locking lever when the carriage is returned to normal position, thereby automatically raising said hook and releasing feed advancing means.

20. In a typewriting machine, the combination of a top plate with guide rails; a carriage truck mounted on said guide rails; a tilting carriage; sockets in ends of said carriage truck; bearings mounted on the ends of carriage by which carriage is pivotally mounted in said sockets; means to return the carriage to the right on the aforementioned guide rails including a hand lever; means to tilt the carriage backwards from its normal position, step by step three spaces, and means to automatically stop the carriage in the desired position when being returned to the right, such means including a spring controlled stop fixed to the top plate of the machine, a stop rail fastened securely to the bottom of the tilting carriage, and adjustable stops mounted on said rail in such a manner that each time said carriage tilting means is operated one of the said stops will come in line with the stop mounted on the top plate of the machine, upon contact with which the carriage will be stopped in correct position for the commencement of a new line of typing.

WILBUR B. TERRY.
FRED FINCHAM.